United States Patent [19]

Särner

[11] Patent Number: 4,966,704
[45] Date of Patent: Oct. 30, 1990

[54] ANAEROBIC PROCESS FOR MICROBIOLOGICAL PURIFICATION OF SULPHUR-CONTAINING WATER

[75] Inventor: Erik Särner, Abbekås, Sweden

[73] Assignee: AC Biotechnics AB, Sweden

[21] Appl. No.: 332,432

[22] Filed: Mar. 30, 1989

Related U.S. Application Data

[63] Continuation of Ser. No. 99,494, Sep. 17, 1987, abandoned.

[30] Foreign Application Priority Data

Sep. 24, 1986 [SE] Sweden .................. 8604043

[51] Int. Cl.$^5$ .............................. C02F 3/30
[52] U.S. Cl. ............................ 210/603; 210/605; 210/617; 210/621; 210/622
[58] Field of Search .......... 210/603, 617, 618, 621, 210/622, 605, 150, 151, 916, 757

[56] References Cited

U.S. PATENT DOCUMENTS

| | | | |
|---|---|---|---|
| 4,311,593 | 1/1982 | Benjes et al. | 210/603 |
| 4,351,729 | 9/1982 | Witt | 210/603 |
| 4,384,956 | 5/1983 | Mulder | 210/603 |
| 4,396,402 | 8/1983 | Ghosh | 210/603 |
| 4,519,912 | 5/1985 | Kauffman et al. | 210/616 |
| 4,584,271 | 4/1986 | Stern et al. | 210/616 |
| 4,597,872 | 7/1986 | Andersson et al. | 210/603 |
| 4,627,917 | 12/1986 | Morper | 210/617 |
| 4,664,803 | 5/1987 | Fuchs et al. | 210/617 |
| 4,696,747 | 9/1987 | Verstraete et al. | 210/150 |

FOREIGN PATENT DOCUMENTS

| | | | |
|---|---|---|---|
| 0142123 | 6/1986 | European Pat. Off. | |
| 0192631 | 8/1986 | European Pat. Off. | |
| 2449066 | 10/1980 | France | 210/617 |
| 2484990 | 12/1981 | France | |
| 2541669 | 8/1984 | France | |
| 2143810 | 2/1985 | United Kingdom | |
| 2167055 | 5/1986 | United Kingdom | |

Primary Examiner—Tom Wyse
Attorney, Agent, or Firm—Burns, Doane, Swecker & Mathis

[57] ABSTRACT

A two-step process for microbiological purification of contaminated water, comprising a first step using anaerobic conditions in a reactor having a stationary bed and a biofilm fixed thereon followed by conventional microbiological purification, characterized in that in said first step the water is supplied at the upper end of the reactor and is brought to trickle over the fixed biofilm without drenching the bed and while maintaining a continuous gasphase within the bed.

11 Claims, 1 Drawing Sheet

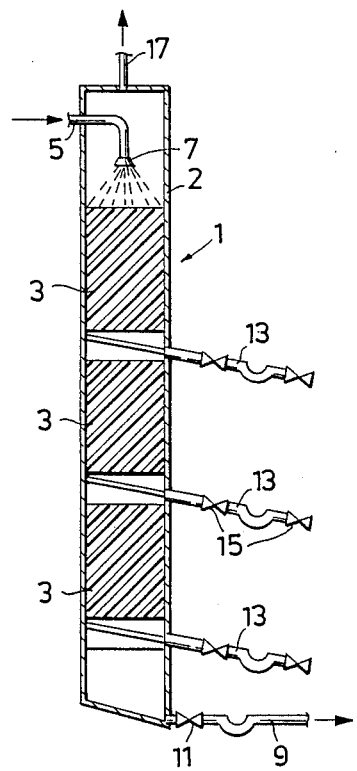

ANAEROBIC PROCESS FOR MICROBIOLOBICAL PURIFICATION OF SULPHUR-CONTAINING WATER

This application is a continuation of application Ser. No. 099,494, filed Sept. 17, 1987, abandoned.

The present invention relates to a process for the purification of contaminated water in a biological manner while using anaerobic conditions in a reactor having a stationary bed and biofilm fixed thereon.

In biological purification methods two different processes are in principal used, namely aerobic process and anaerobic process. In using aerobic purification techniques two types of processes have hitherto dominated, namely the active sludge process and the biological bed. Not until recently one has started to utilize filler materials quenched in water in aeration basins. In many cases the purpose of such a procedure has been to maintain on the filler material slowly growing nitrification bacteria in the system.

Within the anaerobic purification techniques the development has been different. The conventional digester was developed to the contact process, i.e. the anaerobic active sludge process. During the last ten to fifteen years anaerobic filters having fixed filler elements quenched in liquid have been developed and have entered into use.

The present invention while utilizing anaerobic purification techniques aims at using instead of a drenched bed something which can be considered as an anaerobic parallel to the bio-bed, i.e. a new process where under anaerobic conditions a thin liquid film is allowed to trickle over a stationary bed having a biofilm fixed thereto. As far as we know no such process has been utilized or even discussed.

Thus, the present invention relates to a process for the purification of contaminated water in biological manner while using anaerobic conditions, the process being operable in a reactor having a stationary bed and a biofilm fixed thereto. The process is characterized thereby that the contaminated water is supplied at the upper part of the reactor and is brought to flow downwardly on the fixed biofilm without drenching the bed and while maintaining a continuous gas phase within the bed. A reactor of this type is in anglosaxon literature called "trickling or percolating filter". The expression thus means that the bed is not drenched in liquid but contains a continuous gas phase, whereas the liquid in the form of a thin liquid layer flows over the biofilm present within the bed material.

The bed material of the reactor can be constituted by some plastic or some inorganic material. As a plastic there may be mentioned polyesters or polyvinyl chlorides, whereas the inorganic material can be stone, glass, fired clay or other ceramic material.

The process according to the present invention can be applied in principally two different ways. First, the contaminated water can be totally purified and then discharged into a suitable recipient. Second and particularly preferred, the contaminated water can be made subject to pretreatment, for example for hydrolysis, acidification, removal of oxidizing agents or depoisoning, the water being then subject to conventional purification, for example in an anaerobic-aerobic process. In the latter alternative the pretreatment is preferably constituted by depoisoning, for example for the removal of sulphur compounds from the water. This pretreatment for depoisoning suitably involves reduction of the sulphur compounds, e.g. using sulphate-reducing bacteria, to form hydrogen sulphide which is then separated. Third, the contaminated water can be, in the same manner as above, subjected to pretreatment, part of the water treated in the subsequent process or processes being recirculated to the pretreatment. The purpose of this recirculation may for example be to provide for a suitable pH-value or a suitable redox-potential.

According to the particularly preferred purification procedure of the present invention there is thus provided a two-step process for microbiological purification of contaminated water, said process comprising a first pretreating step using anaerobic conditions in a reactor having a stationary bed and a biofilm fixed thereon followed by a conventional second purification step, such as an anaerobic-aerobic process. In this two-step process of the invention said first step resides in supplying the water at the upper end of the reactor, the water being brought to trickle or percolate over the fixed biofilm without drenching the bed and while maintaining a continuous gasphase within the bed.

As indicated above the two-step process of the invention is particularly useful in depoisoning contaminated waters, particularly as a pretreatment step for removing undesired sulphur compounds from the water to be treated before entering the second conventional purification step. Such removal of sulphur compounds is suitably performed by reducing same to hydrogen sulphide gas which is then separated. In such reduction of the sulphur compounds any type of known sulphate-reducing bacteria can be used.

The process according to the invention can be performed in such a manner that treated water is allowed to recirculate through the reactor. Recirculation may also be used in relation to gases formed in the process, for example carbon dioxide and methane gas. Also in later treatment steps gases formed can be circulated through the reactor.

The biological reactor used in the process according to the invention is thus characterized by an upstanding container or tower, wherein solid fixed material is arranged and on which microorganisms are allowed to grow under the formation of a so called biofilm on the material. The contaminated water is then supplied at the top of the container and distributed over the solid material of the bed grown over by microorganisms. The reactor is sealed off from the surrounding air so that oxygen is excluded from the interior of the container, i.e. the biological reactions taking place in the reactor are of an anaerobic character. The surface of contact between the water flowing on the biofilm and the surrounding gas is very large in the reactor. The retention period will be relatively short in comparison with the case of using a drenched bed.

BRIEF DESCRIPTION OF THE DRAWING

The invention will in the following be further illustrated in connection with specific examples and with reference to the appended drawing, wherein the FIGURE shows diagramatically an example of an embodiment of an anaerobically operating reactor.

DETAILED DESCRIPTION OF PREFERRED EMBODIMENT

The reactor shown in the drawing and generally designated 1 contains a cylindric elongated container 2 containing a solid bed 3 divided up into three sections.

Container 2 is provided with a liquid inlet 5 for the water to be purified passing over into a spray nozzle 7 for the distribution of supplied water over bed 3. The container is, furthermore, provided with an outlet 9 having a closure valve 11.

In the area between bed sections 3 drainage tubes 13 are provided to enable sampling at different levels of the reactor. These drainage tubes 13 are each provided with two closure valves 15 enabling water sampling with lock under operation. The reactor is finally provided with a gas outlet 17 for discharge of generated gases.

In the following two examples there is illustrated on the one hand total purification of sewage water, and on the other hand depoisoning of sulphur-containing water.

EXAMPLE 1

A sewage water having a COD-concentration of 6 700 mg/l is anaerobically purified in a reactor working according to the principal of the present invention. The water flow is about 40 m$^3$/hour. The reactor contains as a packing material a PVC-plastic of the block type (Biodek ® sold by AB Carl Munters, Sweden). The bed height is 8 m and the cross sectional area 54 m$^2$ corresponding to a diameter of 8.3 m.

The load on the bed is about 15 kg COD/m$^3$ and day. The hydraulic load used is 1.5 m$^3$/m$^2$ and hour and this value is based on water recirculated to 100%.

The COD-reduction over the reactor used is about 75%, whereas the BOD-reduction is about 85%. In the purification methane gas is generated in an amount of somewhat more than 1500 Nm$^3$ per day.

EXAMPLE 2

A sewage water having a COD-concentration of 7 200 mg/l is depoisoned by treatment in a reactor working according to the principal on which the present invention is based. The sulphur contents in the water are about 1000 mg/l SO$_4$ calculated as sulphur. The flow is about 50 m$^3$/hour. The packing material used is the same as in Example 1. The filter height is 8 m and the cross sectional area 31 m$^2$ corresponding to a diameter of 6.3 m.

The load on the filter is about 35 kg COD/m$^3$ and day. The hydraulic load used is about 1.6 m$^3$/m$^2$ and hour. No recirculation is used.

The COD-reduction in the treatment in the reactor is about 25%, whereas the sulphur separation rate is about 75%. The methane production is low. The gas formed contains a high content of hydrogen sulphide and is washed in a separate washing step and recirculated over the reactor.

The depoisoned sewage water is then subjected to conventional purification in an anaerobic-aerobic system.

The use of a non-drenched anaerobic filter in accordance with the techniques of the present invention offers substantial advantages compared to the use of a conventional anaerobic filter or a conventional contact process. Among such advantages the following may be mentioned.

The construction of the system means that the thickness of the biofilm can be hydraulically controlled. Moreover, increased reaction rate can be expected because of the very large contact surface obtained between gas and liquid and this in turn means that the concentration of the carbon dioxide in the biofilm can be kept at a relatively low level. A high content of carbon dioxide has been found to have an inhibiting influence on the metabolism of the methane bacteria. The system is simple in construction and involves substantial technological process advantages associated with processes utilizing biofilm. Moreover, the system can be used as a pretreatment step of a conventional system based on anaerobic-aerobic process. This pretreatment can be constituted by hydrolysis, acidification, removal of oxidating agents or removal or poisons, such as sulphur-containing compounds.

A process based on biofilm is normally substantially more resistant in relation to poisonous substances than systems using suspended cultures of bacteria. An ecologic succession in direction to the development of organisms capable of breaking down toxic substances is also easier obtained in a process based on biofilm where the through-flow is of the type plug flow. In connection with the use of the system as a pretreatment step the invention is particularly suitable to be used for reducing sulphur compounds to hydrogen sulphide and effective removal of same from the liquid to the gas phase, since the surface of contact between liquid and gas is quite large.

I claim:

1. A two-step process for microbiological purification of contaminated sulphur-containing water, comprising
    depoisoning for removal of sulphur compounds from the water by supplying water at the upper end of a reactor having a stationary bed and a biofilm fixed thereon using anaerobic conditions and bringing the water to trickle over the fixed biofilm without drenching the bed and while maintaining a continuous gas phase within the bed; and
    microbiologically purifying the water that has trickled through said stationary bed.

2. A process according to claim 1 wherein the first purification step takes place in a bed of plastic or inorganic material.

3. A process according to claim 2 wherein the bed is a bed of plastic and the plastic is a polyester or PVC.

4. A process according to claim 3 wherein water treated in said depoisoning step or in said microbiologically purifying step is recirculated.

5. A process according to claim 3 wherein gases generated in the reactor having a stationary bed or in the step of microbiologically purifying the water are circulated through the reactor.

6. A process according to claim 2 wherein the bed is a bed of inorganic material and the inorganic material is glass or fired clay.

7. A process according to claim 2 wherein water treated in said depoisoning step or in said microbiologically purifying step is recirculated.

8. A process according to claim 2 wherein gases generated in the reactor having a stationary bed or in the step of microbiologically purifying the water are circulated through the reactor.

9. A process according to claim 1 wherein the depoisoning involves reduction of the sulphur compounds to form hydrogen sulphide which is then separated.

10. A process according to claim 1 wherein the water treated in said depoisoning step or in said microbiologically purifying step is recirculated.

11. A process according to claim 1 wherein gases generated in the reactor having a stationary bed or in the step of microbiologically purifying the water are circulated through the trickle reactor.

* * * * *